INVENTOR
Donald A. Haase

Aug. 8, 1972   D. A. HAASE   3,682,730
METHOD FOR LAMINATING ORIENTED THERMOPLASTIC
FILM TO THERMOPLASTIC FOAM
Filed Nov. 14, 1969   2 Sheets-Sheet 2

INVENTOR.
Donald A. Haase

United States Patent Office 3,682,730
Patented Aug. 8, 1972

3,682,730
METHOD FOR LAMINATING ORIENTED THERMO-
PLASTIC FILM TO THERMOPLASTIC FOAM
Donald A. Haase, Penfield, N.Y., assignor to Mobil
Oil Corporation
Filed Nov. 14, 1969, Ser. No. 876,814
Int. Cl. B32b 5/20
U.S. Cl. 156—79         3 Claims

ABSTRACT OF THE DISCLOSURE

A method for the production of laminates comprising oriented thermoplastic film heat bonded to a thermoplastic foam which comprises extrusion of a thermoplastic foam containing a blowing agent which has a plasticizing action upon the foam material and while the extruded foam still contains residual blowing agent, heat welding an oriented thermoplastic film to the foam. Disorientation of the oriented film in accord with the present method is eliminated by virtue of the lower heat bonding temperatures necessary to achieve an effective weld by virtue of the presence of the blowing agent-plasticizer material remaining in the foam.

BACKGROUND OF THE INVENTION

(I) Field of the invention

The present invention relates to a method for the production of a film-foam laminate utilizing a heat welding technique. Preferably the lamination of the film to the foam is conducted in-line, i.e. immediately following extrusion of the thermoplastic foam and while such foam still contains a significant amount of residual blowing agent, laminating to said foam an oriented thermoplastic sheet. Advantage is taken of the plasticizing effect of the blowing agent upon the polystyrene foam whereby laminating temperatures requisite to achieve suitable film-foam bonding are substantially lowered, and hence disorientation of the oriented film by exposing it to the normally higher temperatures required for heat bonding such films to foam substrates is avoided.

(II) Description of the prior art

U.S. Pats. Nos. 3,159,698 and 3,220,902 disclose methods for the production of laminations utilizing the heat of extrusion of either the foam material or the film material to achieve heat bonding as such materials exit from adjacent extruders. It will be obvious, however, that such techniques preclude prior biaxial orientation of the plastic film material, since in the disclosures of the aforenoted patents, such films are laminated as they are extruded and cast in place. In the method of the present invention, the preferred materials of laminate construction are oriented polystyrene film and polystyrene foam. In order to orient polystyrene film, it must be heated to above its glass transition temperature, stretched, and chilled while being held under tension. Thus, the methods disclosed in the aforenoted patents may not be employed to heat laminate oriented polystyrene film materials to foam substrates such as foamed polystyrene for example.

U.S. Pat. No. 2,917,217 discloses lamination of preformed sheet material to freshly extruded polystyrene foam. However, it is noted that this patent teaches the employment of adhesive materials to effect bonding of the polystyrene foam and sheet material, such as paper, being laminated thereto. Applicant, however, has found that the employment of extraneous adhesive materials to achieve a good laminar bonding of oriented polystyrene film to polystyrene foam may be eliminated by taking advantage of the softening effect certain blowing agents have on polystyrene foam whereby laminations of oriented styrene film thereto may be achieved at temperatures below those which cause disorientation of the polystyrene film. It will be obvious to those skilled in the art that disorientation of the polystyrene film would result in puckering and rupturing of the film surface during heat bonding of such film to the foam surface, as aforenoted, such disorientation occurring at above certain minimum temperatures. Additionally, disorientation of the film surface of the laminate results in a deterioration of physical properties of the final laminar structure including a decrease in tensile strength, ultimate elongation and toughness.

SUMMARY OF THE INVENTION

The present method provides a process for laminating polystyrene foam containing residual blowing agent, which blowing agent is a plasticizer for the polystyrene foam, to biaxially oriented polystyrene film whereby the heat softening temperature of the foam is lowered by virtue of the presence therein of said plasticizing-blowing agent and where lamination thereof to biaxially oriented polystyrene film may be achieved at temperatures below those which result in film disorientation. It is noted that it may be possible to achieve a lamination of a biaxially oriented polystyrene film to polystyrene foam which contains no residual blowing agent having a plasticizing effect on such foam. However, such a process requires extremely critical temperature control within a narrow heat seal range to effect satisfactory heat seals and further such a process, by virtue of the criticality of the temperature control, has not been found to be operable at production speeds which are satisfactory from an economic point of view.

DESCRIPTION OF SPECIFIC EMBODIMENTS

It has been found in accordance with a specific aspect of the present invention that in order to seal biaxially oriented polystyrene film to a freshly extuded, pentane-based polystyrene foam, the interface sealing temperature should be about 220° F. This temperature will vary somewhat depending upon the physical characteristics of the biaxially oriented polystyrene film and other characteristics of the film-foam components of the laminate as hereinafter discussed. Polystyrene foam which has been extruded utilizing a blowing agent which has little or no plasticizing effect on the foam such as, for example, a Freon, or foam which has been extruded utilizing pentane but which has been stored for a length of time whereby the foam to be laminated contains very low residual amounts of pentane, requires an interface seal temperature, to achieve effective bonding between such foams and oriented polystyrene film, on the order of about 245° F.

Polystyrene has no fixed melting or softening point but rather a softening range. The glass transition temperature of polystyrene, about 195° F., is a temperature at which polystyrene begins to pass from a glassy, hard condition and becomes rubbery or stretchable. If biaxially oriented polystyrene film is reheated, it begins to develop stresses, commonly referred to as deorientation stress release, at about 195° to 200° F. The amount of stress developed within the oriented film is a time-temperature function of the reheating cycle as well as a function of the original orientation process conditions such as, for example, temperatures, stretch ratios, quenching temperature and the like. For rapid reheating cycles, the deorientation stress release is very low, below about 230° F., but rises very rapidly to a maximum at 235 to 240° F. In the event that biaxially oriented polystyrene film is heated above 240° F., it begins to lose orientation unless it is positively restrained in some manner. The amount of orientation loss is a function of time and temperature.

Figure 1:
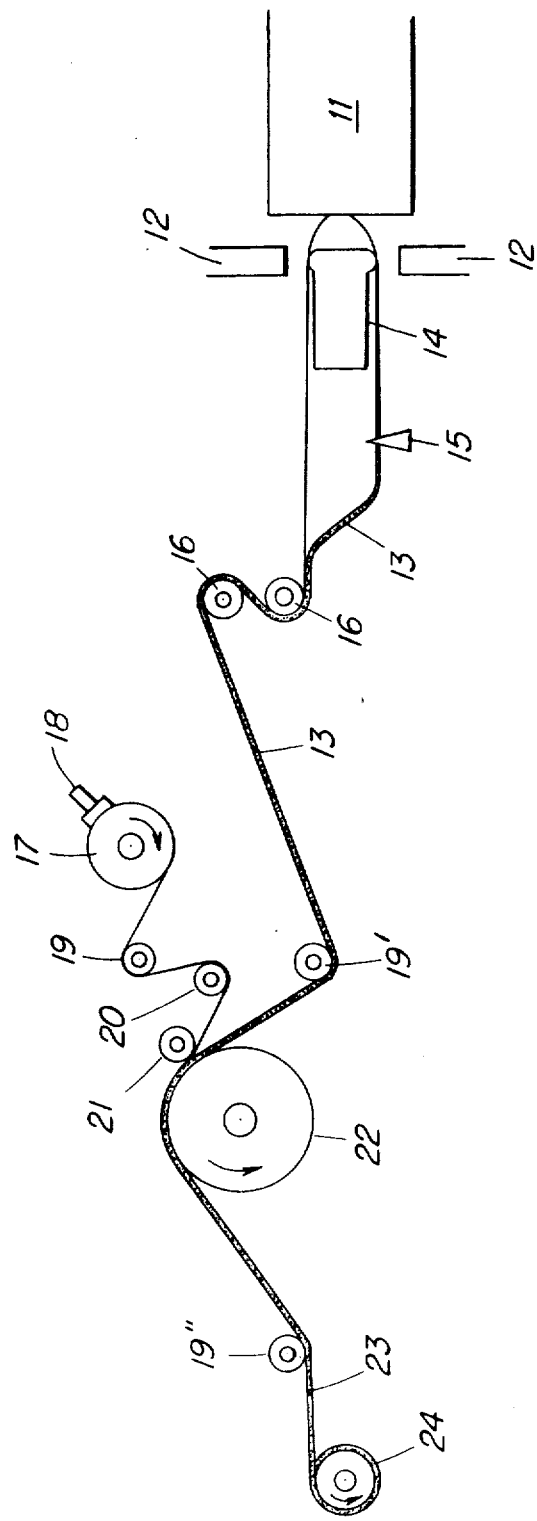
FIG. 1 is a schematic illustration of one form of apparatus which may be employed to produce the film-foam laminates in accord with the method of the present invention.

In the process of the present invention, a seal roller 21 as illustrated in FIG. 1 is utilized to effect an adequate bond between the oriented polystyrene film and foam being laminated thereto. The temperature at which seal roller 21 must be maintained is of course dependent upon the required interface film-foam temperature to form adequate bonding, the input film-foam temperature, the gauge of the film, seal roll material construction, and the like speeds employed. Since, as hereinbefore discussed, the interface seal temperature required to achieve adequate bonding between the oriented polystyrene film and a foam containing little or no plasticizing agent, is at a temperature of about 245° F., i.e. a temperature which results in disorientation of the oriented film, it is not feasible to obtain a good interface seal without loss of orientation at any speed or film gauge.

Foam containing residual pentane, which results in a lowering of the interface seal temperature necessary to achieve adequate bonding, allows for lamination of such film to foam with no resultant disorientation of the film over a range of speeds and gauges of film. It has been found that as the gauge of a film which it is desired to seal to the foam component of the laminate increases, line speeds will be decreased proportionately. For example, the following are approximate limiting line speeds for various gauge films: 1 mil—125 ft./min.; 2 mils—100 ft./min.; 3 mils—70 ft./min.; 5 mils—20 ft./min.

The seal roll temperatures required in order to achieve satisfactory film-foam bonds will necessarily vary with line speed and film gauge. The temperature ranges discussed in the following specific embodiments relate to line speed conditions from about 40 to about 60 ft./min. and film gauges from about 1 to about 3 mils. It will be obvious, therefore, that as line speeds increase, the requisite preheat of the film or foam before lamination will be higher than the specific preheat temperatures discussed hereinafter.

As illustrated in FIG. 1, a standard extrusion apparatus 11 is employed to extrude a tubular polystyrene foam material. Standard extrusion techniques may be employed to produce the polystyrene foam employed in the method of the present invention. For example, a foam may be formed by extruding polystyrene beads which contain incorporated therein a blowing agent such as, for example, pentane or alternatively a direct injection extrusion technique may be employed whereby polystyrene resin pellets are introduced into a standard extruder and, as the polystyrene is formed into a molten mass within the confines of the extruder, a blowing agent such as for example pentane may be injected into the molten mass and the pentane-molten polystyrene polymer admixture may be extruded through a tubular die whereby a polystyrene foam tube is formed. The polystyrene foam tube was drawn over forming mandrel 14 and subsequently slit by slitter 15 to form a flat polystyrene foam sheet identified as 13 in FIG. 1. Extruder cooling ring 12 may be employed to assist in the forming operation to produce the polystyrene tube. The foam polystyrene sheet 13 is subsequently passed through tension control rollers 16, past idler roller 19' and onto the surface of rotating, internally cooled drum 22. Drum 22 may be internally cooled utilizing internally circulated fluids, in order to maintain a constant drum temperature, thereby assuring uniform heat flow conditions at the seal roll. As further illustrated in FIG. 1, oriented polystyrene film 17 is fed from a film supply roller past idler roller 19 and brought into contact with heated roll 20. Heated roll 20 may be maintained at a temperature from about 120° F. to about 220° F. and is preferably maintained at a temperature of about 190° F. Roller 20 may be heated utilizing external heat sources such as infrared lamps and the like or, conversely, roller 20 may be heated utilizing internally circulated heat exchange fluids. Alternate methods of preheating the film include contact with the seal roll a short critical distance in front of the nip. After the oriented polystyrene film 17 has been preheated by contact with heated roll 20, it is passed into the nip formed by seal roller 21 and cooling drum 22 where it is heat-laminated to the continuously advancing polystyrene foam 13 passing over the surface of cooled drum 22. Seal roller 21 may be maintained at a temperature from about 250° F. up to about 350° F. and is preferably maintained at a temperature from about 290° to about 320° F. These temperatures are required, depending on film gauge and speed, in order to achieve an interface temperature of 220° F. needed for heat welds. The polystyrene foam now laminated to the oriented polystyrene film is subsequently passed under idler roller 19" and onto take-up roller 24. Alternatively, the film-foam laminate 23 may be passed on to further processing such as, for example, forming operations. The surface of the polystyrene film in contact with the polystyrene foam may have been previously printed with decorative indicia thereon. Braking members 18 and 18a, which bear against polystyrene rolls 17 and 17a respectively, are employed to control the rate of rotation of rolls 17 and 17a.

It is noted that in the aforedescribed process, applicants have been able to effectively heat-weld oriented polystyrene film to polystyrene foam containing residual amounts of blowing agent, e.g. pentane, which has a plasticizing effect on the foam, lowering its heat softening point whereby heat welds may be formed at an interface temperature of from about 215° F. to about 225° F. and preferably at 220° F., and a preferable seal roll temperature range of from 290° up to about 320° F. In cases where, for example, in a condition line operation whereby the foam has been previously formed and contains minimal amounts of residual pentane, it has been found that difficulties are encountered when attempting to form an effective heat-weld between the film and the foam at seal roll temperatures on the order of from about 290° to about 320° F. It has been found that higher temperatures are requisite at such an operation to form a satisfactory bonding of the film and foam materials, i.e. interface temperature of 245° F. and seal roll temperatures on the order of about 350° F. and higher at comparable speeds and film gauge. Applicants have found that when temperatures on the order of about 350° F. are employed in order to effect bonding together of the oriented film to polystyrene foam, disorientation and rupturing of the oriented polystyrene film occurs. Further, when attempts were made to laminate oriented polystyrene film to polystyrene foam containing no plasticizer at temperatures of about 290° F. to about 320° F., such lower temperatures being selected to insure that the oriented film product would not disorient, it was found that an effective heat-weld was not produced and, in many instances, no bonding of the film to the foam surface occurred.

Figure 2:
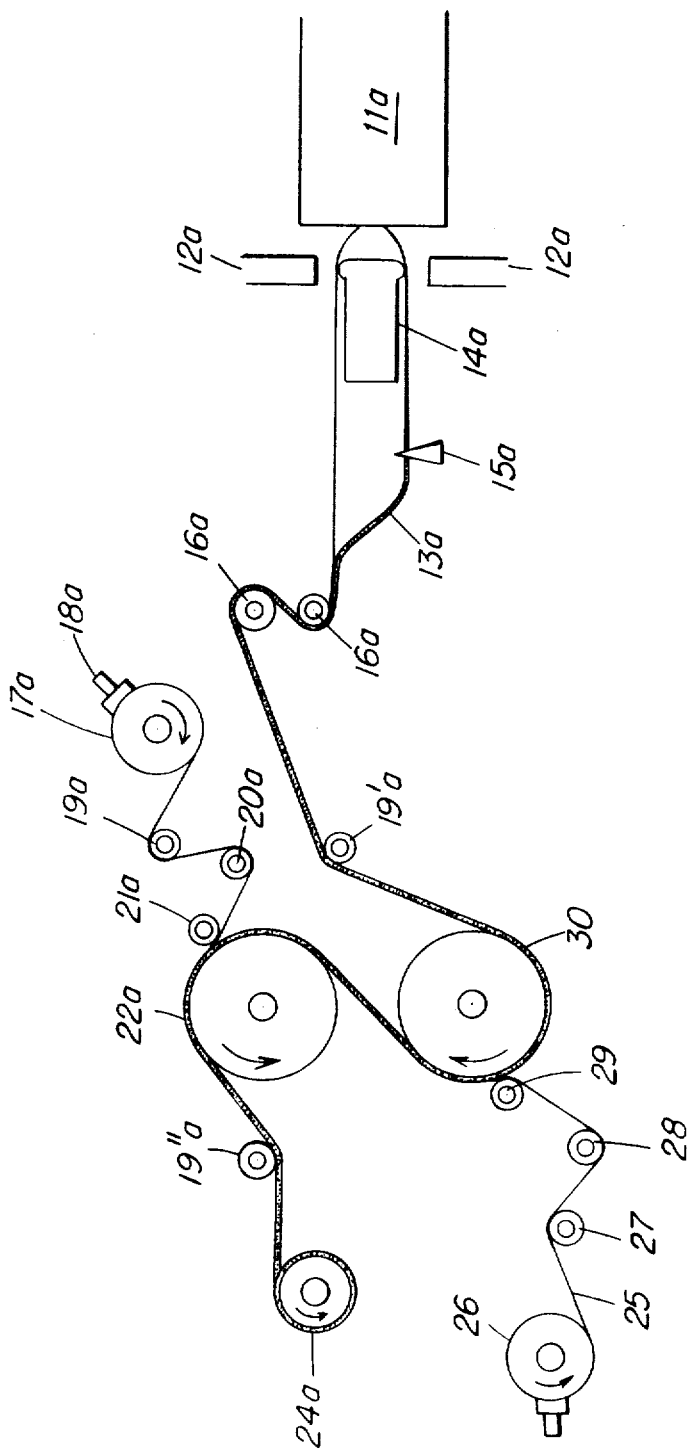
FIG. 2 is a schematic drawing, similar to FIG. 1, illustrating a form of apparatus which may be employed to produce three layer laminates in accord with the method of the present invention.

FIG. 2 illustrates another specific embodiment of the process of the present invention whereby oriented polystyrene film is laminated to both sides of a flattened web of polystyrene foam, said flattened web having been produced by slitting a tubular extrudate of polystyrene foam as shown in FIG. 2. As illustrated in FIG. 2, oriented polystyrene film 25 is fed from film supply roller 25 past idler roller 27 and brought into contact with heated roller 28. A coordinated film extrusion apparatus could be employed as an alternate film source. Heated roller 28 may be maintained at a temperature from about 120° F.

to about 220° F. and is preferably maintained at a temperature of about 190° F. Roller 28 may be heated utilizing external heat sources, not shown, such as infrared lamps and the like, or conversely, roller 28 may be heated utilizing internally circulated heat exchange fluids. After the oriented polystyrene film 25 has been preheated by contact with heated roller 28, it is passed into the nip formed by seal roller 29 and cooling drum 30 where it is heat-laminated to the continuously advancing polystyrene foam 13a passing over the surface of cooling drum 30. Seal roller 29 may be maintained at a temperature of from about 250° F. up to about 350° F. and is preferably maintained at a temperature of from about 290° to about 320° F. The polystyrene foam which now has one surface thereof laminated to an oriented polystyrene film is passed around cooling drum 30 and onto the surface of cooling drum 22a whereon as it is nipped by heat seal roller 21a, the uncoated surface of the foam is laminated with a second oriented polystyrene film 17a, which has been preheated as hereinbefore described utilizing heated roller 20a. The triple layer laminate comprising an internal polystyrene foam core and external layers of oriented polystyrene film is passed from the surface of continually rotating cooling drum 22a, beneath idler roller 19"a and onto wind-up roller 24a. Alternatively, the film foam laminate may be passed onto further processing such as, for example, forming operations. Additionally, the surface of one or both of the polystyrene films which are heat welded to the polystyrene foam may have been previously printed with decorative indicia thereon.

As hereinbefore discussed, in accord with the method of the present invention, advantage is taken of the plasticizing action of the blowing agent employed to produce the polystyrene foam in order to form the laminate structures of the present invention. Namely, since the blowing agent-plasticizer material has a tendency to lower the heat softening point of the polystyrene foam, effective heat bonding of such blowing agent-containing foam may be achieved at temperatures below those temperatures which cause disorientation of the oriented polystyrene film being bonded thereto. It will be understood that a wide variety of blowing agents which have this effect upon the polystyrene foam sheet, i.e., lowering the softening temperature thereof, may be employed in accord with the method of the present invention. Although the preferred blowing agent as hereinbefore discussed is pentane, examples of other blowing agents which may be employed in accord with the method of the present invention include isopentane, propane, acetone, methyl acetate, or aliphatic hydrocarbons such as hexane, heptane, etc.

The oriented polystyrene film which is employed in the method of the present invention may be produced utilizing a tubular film extrusion operation wherein a blown tube of crystalline polystyrene film is formed and the blown tube is taken up at a rate higher than the extrusion rate of the tube from the die whereby both transverse and machine direction orientation are imparted to the tube before it is collapsed and subsequently slit to form the oriented sheet film stock material.

The biaxially oriented polystyrene film employed in the lamination process described in the following Examples 1 and 2 was prepared from a polystyrene resin identified by the manufacturer as Sinclair Koppers D-8. The resin was fed to a standard rotating screw type extruder having a length to diameter ratio of 24:1. The polystyrene extrudate was passed from the extruder at a temperature of about 368° F. into a standard tubular die. The die temperature was maintained at about 350° F. and the die pressure was approximately 4,700 p.s.i. The die orifice gap was maintained at approximately 0.025 inch, and as the molten polystyrene emerged from the orifice, it was stretched, i.e. blown, utilizing the conventional entrapped air bubble technique. The blow up ratio of the polystyrene tube was approximately 10:1. The blown tube was collapsed utilizing standard collapsing shields and nip rollers. The nip rollers were driven at a higher speed than the extruder output velocity at the die lips in order to stretch the extrudate and impart machine direction orientation thereto. The machine direction orientation ratio was about 2.5:1. Transverse direction orientation was achieved by blowing the tube to increase its diameter intermediate the die and the nip rollers. External air-rings were employed during the extrusion operation to cool the extrudate as it emerged from the die to a desired orientation temperature of about 240° F. as it was biaxially stretched. The biaxially oriented polystyrene film exhibited the following properties:

FILM PROPERTIES

|  | Yield strength, p.s.i. | Elongation, percent | Modulus, p.s.i. |
| --- | --- | --- | --- |
| M.D. | 10,600 | 5 | 423,000 |
| T.D. | 10,400 | 5 | 422,000 |

Example 1.—A polystyrene foam tube was formed using the direct injection extrusion process described in U.S. Pat. No. 3,444,283, utilizing pentane as the blowing agent. As illustrated in FIG. 1, the polystyrene foam tube was drawn over forming mandrel 14 and subsequently slit by slitter 15 to form a flat polystyrene foam sheet 13. The blow up ratio of the polystyrene foam tube was approximately 6:1 and the gauge of the polystyrene foam sheet 13 formed from the tube was approximately 70 mils. The density of the foam material is about 4.5 pounds per cubic foot. Foam sheet 13 was subsequently passed through tension control rollers 16, around idler roller 19' and onto the surface of internally cooled drum 22. Drum 22 was maintained at a temperature of about 70° F. Biaxially oriented polystyrene film having a gauge of about 2 mils and formed utilizing the tubular film extrusion technique hereinbefore described was fed from supply roller 17 around idler 19 and into contact with heated roll 20 which was maintained at a temperature of about 190° F. After passing from heated roll 20, the preheated biaxially oriented film 17 was passed into the nip formed by seal roller 21 and cooling drum 22 where it was heat laminated to the continuously advancing polystyrene foam 13 passing over the surface of cooled drum 22. The temperature of seal roller 21 was maintained at about 300° F. Seal roller 21 was a 6-inch diameter chrome-plated steel roll. The laminate which emerged from the nip formed by seal roller 21 and drum 22 was approximately 48 mils thick. The line speed for laminate production was about 39 ft./min. The laminate 23 was characterized by having an excellent interfacial bond intermediate the oriented polystyrene film 17 and foam layer 13. There was no disorientation of the oriented film layer component of the laminate as a result of the heat laminating step.

Example 2.—A triple layer laminate comprising an inner core of polystyrene foam and external layers of biaxially oriented polystyrene film was produced utilizing the apparatus illustrated in FIG. 2. The extrusion conditions for the polystyrene foam were identical to those employed in Example 1. The gauges of both the biaxially oriented polystyrene film, 17a and 25, the gauge of the polystyrene foam, line speeds, and the temperature of the heated rollers, seal rollers and cooling drums were identical to those employed in accordance with Example 1. The triple layer laminate produced, comprising an internal polystyrene foam core and external layers of oriented polystyrene film had a gauge of about 40 mils. The final laminate exhibited excellent oriented film to foam adhesion and the oriented film layer components of the laminate showed no signs of disorientation as a result of the heat laminating process.

Although the process of this invention has been illustrated with preferred embodiments, it is to be understood that modifications and variations may be employed without departing from the spirit and scope of this invention, as those skilled in the art will readily understand. Such variations and modifications are therefore considered to be within the purview and scope of the appended claims.

What is claimed is:

1. A method for the production of a laminar structure comprising a layer of polystyrene foam and at least one layer of a biaxially oriented crystalline polystyrene film which comprises:
   (a) extruding a polystyrene foam containing a blowing agent which has a plasticizing effect on the polystyrene foam;
   (b) bringing said polystyrene foam, still containing residual quantities of said blowing agent, into contact with said oriented polystyrene film; and
   (c) heat bonding said foam and said fim together at a temperature below the disorientation temperature of said polystyrene film.

2. A method in accordance with claim 1 wherein said oriented polystyrene film is preheated prior to heat bonding said foam and said film together.

3. A method in accordance with claim 1 wherein a layer of said oriented polystyrene film is heat bonded to both surfaces of said polystyrene foam whereby a three layer laminate is formed comprising a polystyrene foam core sandwiched between two layers of said oriented polystyrene film.

References Cited

UNITED STATES PATENTS

| | | | |
|---|---|---|---|
| 2,962,406 | 11/1960 | Rosa | 156—79 UX |
| 3,028,279 | 4/1962 | Heberlein | 156—229 X |
| 3,081,212 | 3/1963 | Taylor, Jr. et al. | 156—229 X |
| 3,220,902 | 11/1965 | Edwards | 156—79 |
| 3,398,035 | 8/1968 | Cleerman et al. | 156—229 X |

FOREIGN PATENTS

| | | | |
|---|---|---|---|
| 765,904 | 1/1957 | England | 102—43 P |

SAMUEL W. ENGLE, Primary Examiner

G. E. MONTONE, Assistant Examiner

U.S. Cl. X.R.

156—229